United States Patent [19]

Werth, Jr.

[11] 4,351,207

[45] Sep. 28, 1982

[54] MICROMETRICALLY ADJUSTED TOOL ARM ASSEMBLY

[75] Inventor: Carl H. Werth, Jr., Bridgeport, Mich.

[73] Assignee: Werth Engineering, Inc., Bridgeport, Mich.

[21] Appl. No.: 193,431

[22] Filed: Oct. 3, 1980

[51] Int. Cl.³ .................. B23B 29/034; B23B 29/18
[52] U.S. Cl. .................... 82/36 R; 82/1.2; 82/24 A; 407/10; 408/156; 408/714
[58] Field of Search .............. 82/36 R, 24 R, 1.2, 82/2 E; 408/76, 156, 714, 154, 181, 239 R, 155, 159, 180; 407/8, 9, 10, 120

[56] References Cited

U.S. PATENT DOCUMENTS

| | | | |
|---|---|---|---|
| 2,859,084 | 11/1958 | Raddin | 407/8 |
| 2,988,943 | 6/1961 | Tribce | 407/10 |
| 3,232,153 | 2/1966 | Davis | 82/36 R |
| 3,749,508 | 7/1973 | Schukrafft | 408/156 |

Primary Examiner—Leonidas Vlachos
Attorney, Agent, or Firm—Learman & McCulloch

[57] ABSTRACT

A micrometrically adjusted tool arm assembly for mounting on a spindle or a non-rotating support has a tool arm with a mount thereon for generally centrally supporting a tool bar. Only the end sections of the arm are secured to a base support and a slot system extends axially through the arm so that the central section can move radially relative to the ends of the arm. A micrometrically adjustable positioner mechanism engages the central section in a position relative to the slot system to provide a rigid backup for the tool bar. When the assembly is mounted on a spindle a releasable lock is provided which functions to deform the slot system and move the central section radially to engage positioner mechanism at a preselected position.

12 Claims, 4 Drawing Figures

MICROMETRICALLY ADJUSTED TOOL ARM ASSEMBLY

BACKGROUND OF THE INVENTION

The present invention relates generally to tool arm assemblies of the general character disclosed in prior U.S. Pat. Nos. 3,190,152 and 3,812,747, and more particularly to novel and useful improvements which enable the tool arm assembly of the present invention to be mounted on a spindle or a non-rotating similar support. Tool arm assemblies of this type are required to be accurate in the ten thousandths of an inch range and must be adjustable for wear of the tool as it is used.

One of the prime objects of the present invention is to provide a mechanically operated tool arm assembly of the character indicated in which the adjustable central tool bar supporting section of the tool arm which is used with the assembly is rigidly locked for extreme accuracy and reliability even though the arm includes a deformable slot system which permits movements of the central section relative to its ends.

Another object of the present invention is to provide a tool arm assembly of this character which will provide a long and maintenance-free service life.

SUMMARY OF THE INVENTION

A resilient bar with a slot system separating a generally centrally disposed, tool bar mounting portion thereof from its ends is secured only by its ends to a base support so the central section is free to move radially relative to the bar ends. Positioner mechanism engages the central section at a carefully chosen position relative to the slot system such that a rigid backup for the tool bar is provided.

Other objects and advantages of the invention will be pointed out specifically or will become apparent from the following description when it is considered in conjunction with the appended claims and the accompanying drawings wherein:

Figure 1:
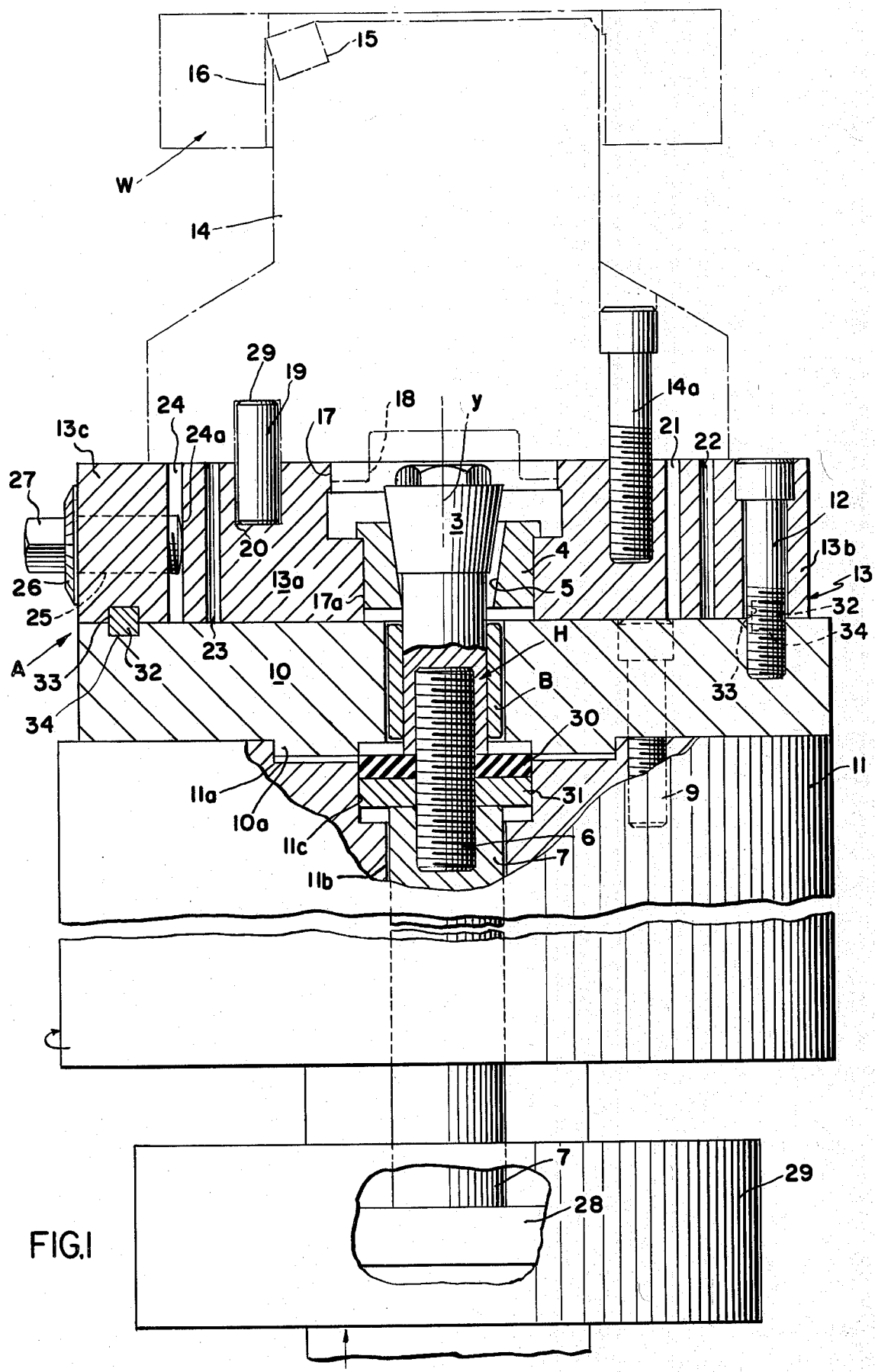
FIG. 1 is a partly sectional elevational view of one of the tool arms illustrated, mounted on a spindle and draw bar assembly and taken on the line 1—1 of FIG. 2, the chain lines indicating a tool bar mounted in machining position within the bore of a workpiece.
Figure 2:
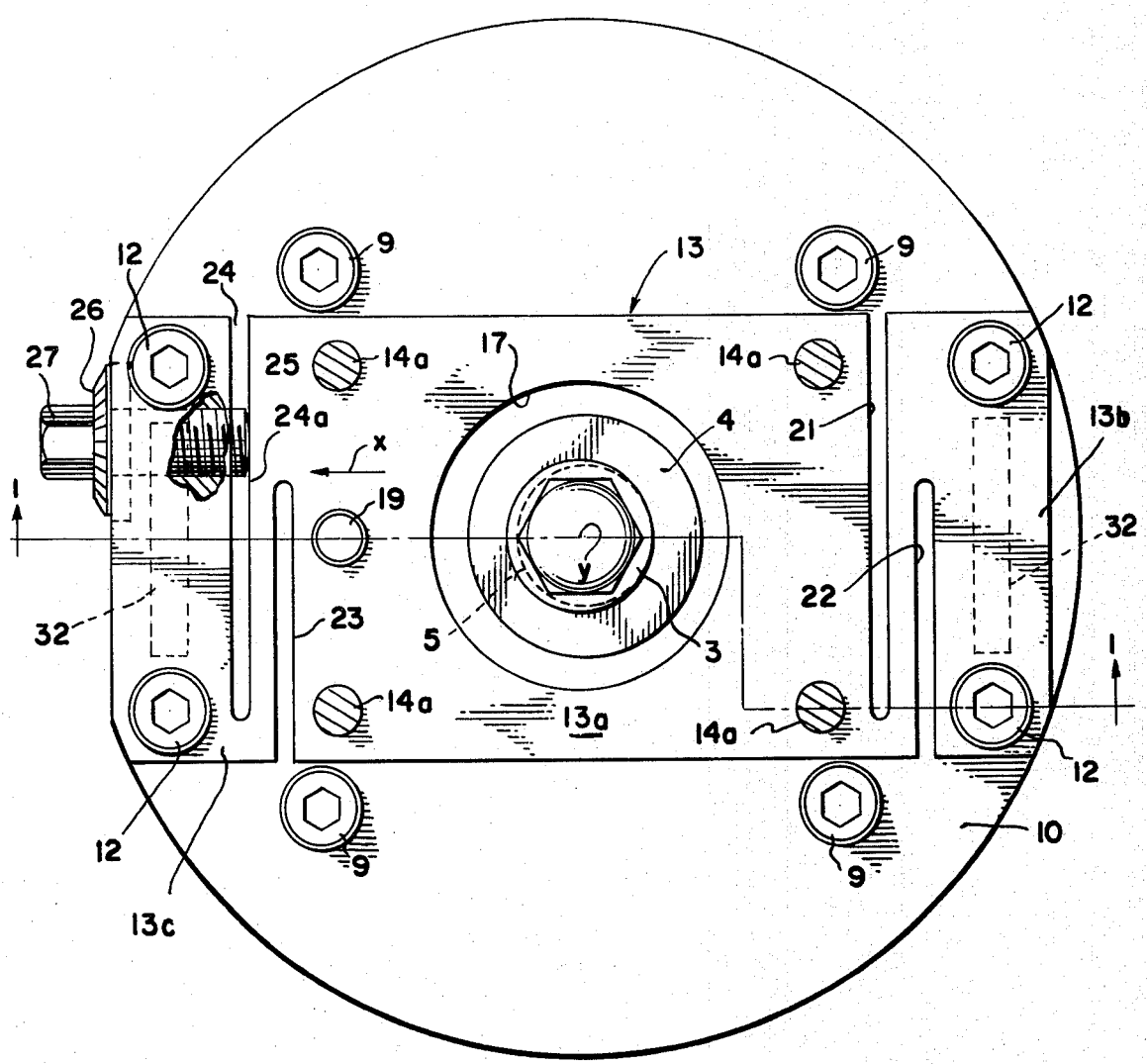
FIG. 2 is a top plan view thereof with the tool bar and workpiece omitted in the interest of clarity.

Referring now more particularly to FIGS. 1 and 2 of the accompanying drawings, a tool arm assembly, generally indicated A, is illustrated which can function on a rotary spindle or as a micrometrically adjustable tool arm assembly on a stationary mount member such as the turret of an N/C machine tool. The tool arm assembly, which is illustrated in FIGS. 1 and 2 as machining a stationary workpiece W (in chain lines), includes a baseplate 10 which mounts, as via bolts 9, to the rotary spindle 11 of a machine tool in which the spindle 11 is revolved. As will be noted, a pilot shoulder 10a provided on baseplate 10 is received in a recess 11a provided in spindle 11. Bolted to the baseplate 10, as at 12, are the radially outer portions of a resilient spring steel plate, generally designated 13, which mounts the tool holder 14 with machining tool 15 (also both in chain lines). As illustrated, the tool 15 comprises a boring tool shown in machining position within the bore 16 of workpiece W.

It will be noted that plate 13 includes a mobile central section 13a and a pair of radially outer fixed sections 13b and 13c. Provided in the central section 13a to facilitate mounting of the tool holder 14 in position is a recess 17 into which the pilot shoulder 18 on tool holder 14 is received. A pin 19, extending within opening 20 provided in the plate 13, and opening 21 provided in the tool holder 14, is used to prevent relative rotation of the tool holder 14 and central portion 13a of plate 13, and serves to orient the tool 15, pin 19 serving as a locator so that tool 15 is always in proper circumferential position. Bolts 14a can be provided to lock the tool holder 14 to the central portion 13a of bar 13. Provided in the radially outer ends of the plate 13 are pairs of radially inner and outer slots 21, 22 and 23, 24, which are oppositely disposed on opposite sides of the bar 13 radially inward of the mount bolts 12. Provided to engage the radially inner face 24a of the outer slot 24 is a radailly adjustable positioning screw 25 mounting a graduated dial 26 which facilitates adjustment of the screw 25 to given radial positions. Screw 25 is provided with a hex-head 27 to permit its ready rotative adjustment.

Extending centrally up into the opening 17 in bar 13 is a drawbar head generally designated H having a concentrically positioned frustoconical upper portion 3 adapted to coact with an eccentrically mounted bushing 4 received in a reduced diameter, concentric portion 17a of opening 17. It will be noted that the eccentrically mounted bushing 4 is provided with a complementally tapered bore surface 5 which coacts with the drawbar surface 3 to move the central section 13a toward screw 25. Provided in baseplate 10 to accommodate axial movement of the drawbar 22 is a slide bushing B and a stud 6 secures the drawbar head H to the drawbar 7 which extends axially freely up through the opening 11b in spindle 11 and connects with a piston 28 provided in a double acting, solenoid controlled, air operated cylinder 29. For purposes of facilitating drawbar mounting, the spindle 11 is recessed further as at 11c to accommodate a resilient washer 30 backed by a stop washer 31. To resist torsional movement of the bar ends 13b and 13c relative to baseplate 10, keys 32 are provided in key openings 33 and 34 in the plate 13 and the baseplate 10 respectively.

In FIG. 1, the tool 15 is shown in machining position, with the drawbar head 3 drawn axially down sufficiently, as typically with 4000 pounds of pressure, to force the tool bar 14 to the left in the figure by virtue of deformation of the slotted portions of both the right and left ends of resilient, spring steel plate 13. In FIG. 2, the deformation of slots 21-22 and 23-24 is exaggerated to indicate what happens in terms of adjustments of ten thousandths of an inch. It is the adjusted position of screw 25 which determines the machining position and, when drawbar head 3 is moved upwardly to relieve the pressure on plate 13 (via piston control 28), the tool bar 14 and the tool 15 are free to return radially inwardly with the central portion 13a of plate 13 to a position in which the tool 15 can be backed axially out of the bore 16 without leaving a dragout line on the workpiece W.

When the device is being used on a rotary spindle, the drawbar head 3 is pulled downwardly and the members 13 and 10 are compressively axially loaded to tend to force them rigidly against the spindle 11 with the tapered surface of member 3 securely locked against the tapered bore surface 5 of bushing 4. The loading (deforming) of plate 13 in the direction x forces the midportion of plate 13 firmly against the pre-positioned screw 25. Either spindle 11 or workpiece W can be fed axially in the conventional manner to accomplish the machining operation. Because screw 25 engages the surface 24a of slot 24 at a location at least partly laterally offset from slot 23, the portion of plate section 13a in contact with screw 25 is solid metal (i.e. slotless) over to the axis of rotation y, and tool 15 can have no radial play.

When the assembly is used on a stationary turret, the drawbar assembly is eliminated and positioning of the tool 15 carried by the tool holder 14 is accomplished solely with adjustment of the adjusting screw 25. The screw 25 is adjusted to deform (load) the plate 13 to position a tool 15 located 180° opposite the tool position which is shown, but the tool 15 similarly is rigidly supported because screw 25 is in offset position. The workpiece can be fed axially relative to the tool 15 to accomplish the machining function.

Figure 3:
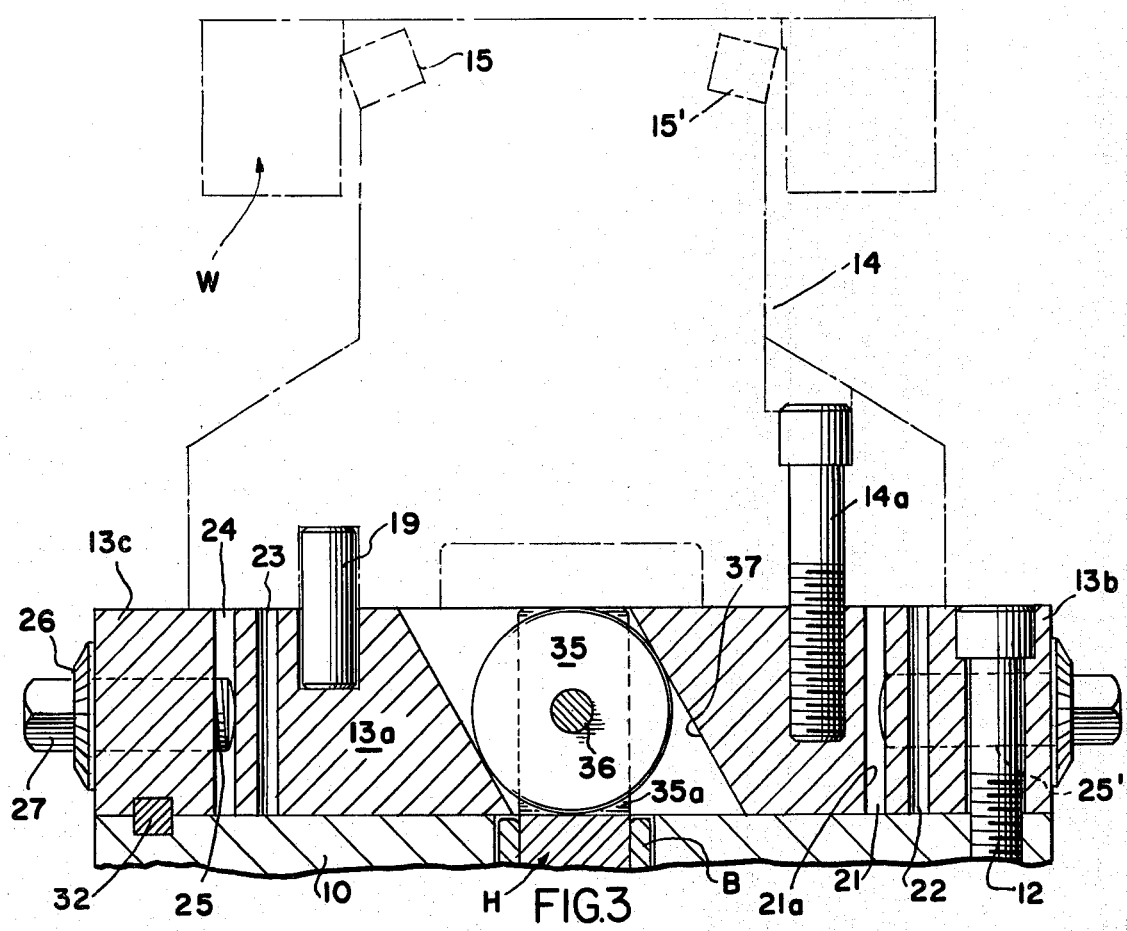
FIG. 3 is a view similar to FIG. 1 illustrating another tool arm assembly.
Figure 4:
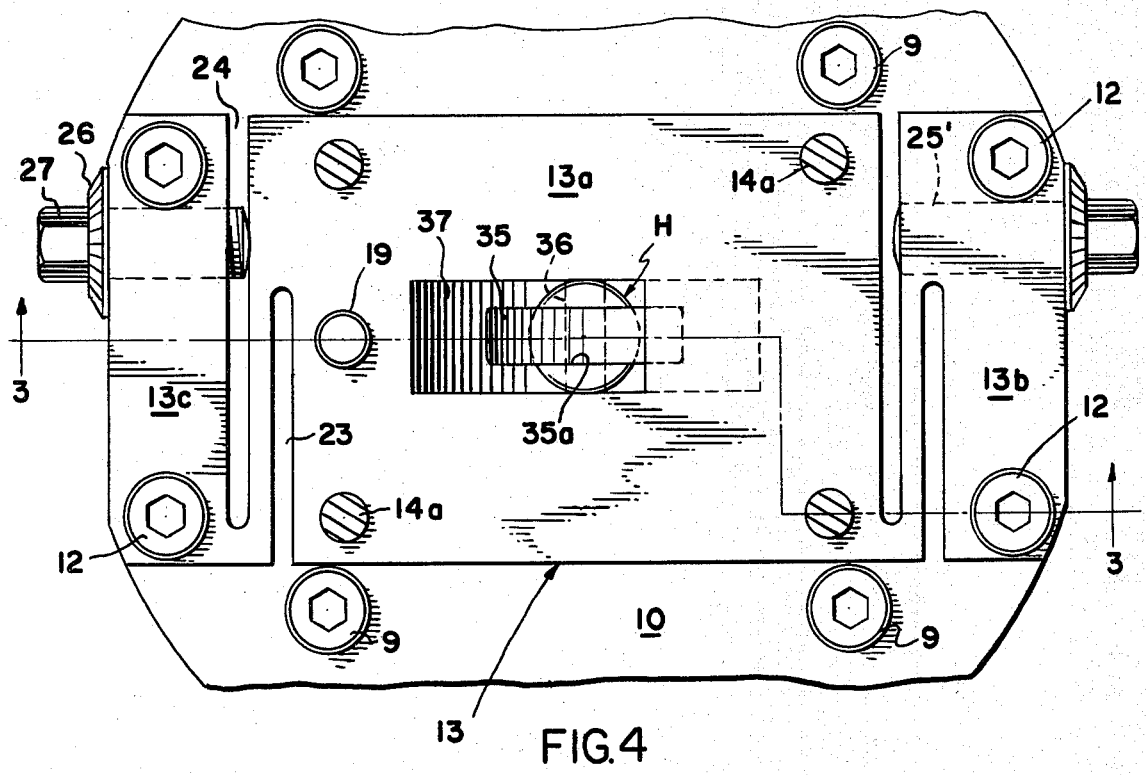
FIG. 4 is a top plan view thereof.

Referring now more particularly to FIGS. 3 and 4, it will be noted that I have used the same numerals to refer to identical parts. In this additional tool arm assembly a second positioning screw 25' is shown, which extends radially into the slot 21, in position to engage the radially inner marginal wall of slot 21 when the central section 13a of the tool plate is shifted to the right. The vertically movable drawbar 22 now rotatably mounts a roller 35 in a slot 35a in the upper end of drawbar H via pin 36. The roller 35 rides in a vertically inclined slot 37 provided in the central section 13a of plate 13. Movement of the drawbar upwardly will release the central section 13a of plate 13 to return to the right in FIG. 3 and back the tool 15 radially away from the machining position in which it is shown. To use a second tool 15' as, for instance, a finishing tool, after completing the cut with tool 15, drawbar H is moved upwardly to cause the central section 13a of the plate 13 to be moved to the right to a position in which the inner marginal wall 21a of slot 21 comes into locked engagement against positioning screw 25' in position to take a finishing cut.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a micrometrically adjusted tool arm assembly for mounting on a spindle or a non-rotating support, having a resilient tool arm with axially extending means thereon for generally centrally supporting an axially extending tool bar, and having its end sections only secured to a base support; deformable slot means extending axially through the tool arm to condition the central section for planar radial movement relative to the ends of the arm perpendicular to said axially extending tool bar supporting means; a micrometrically adjustable positioner engaging said central section in a position relative to said slot means to provide a rigid backup for said tool bar; said slot means including a pair of oppositely disposed, closely spaced slots extending laterally from opposite sides of the tool arm between each end section and the central section, each slot terminating short of the side opposite to the side from which it extends, said positioner comprising a radially adjustable abutment in the plane of the tool arm contacting the radially inner face of one of the outer slots at a position at least partly laterally offset from the inner slot of the pair.

2. The assembly of claim 1 in which said abutment is provided by the end of a radially extending screw mounted for radial adjustment relative to an end section to deform the slot means portion of the tool arm and displace the central section thereof in a radial direction.

3. In a micrometrically adjusted tool arm assembly for mounting on a spindle or a non-rotating support, having a resilient tool arm with means thereon for generally centrally supporting an axially extending tool bar, and having its end sections only secured to a base support; deformable slot means extending axially through the tool arm to condition the central section for radial movement relative to the ends of the arm; a micrometrically adjustable positioner engaging said central section in a position relative to said slot means to provide a rigid backup for said tool bar; said slot means including a pair of oppositely disposed, closely spaced slots extending laterally from opposite sides of the tool arm between each end section and the central section, each slot terminating short of the side opposite to the side from which it extends, said positioner comprising a radially adjustable abutment in the plane of the tool arm contacting the radially inner face of one of the outer slots at a position at least partly laterally off-set from the inner slot of the pair; said abutment being provided by the end of a radially extending screw mounted for radial adjustment relative to an end section to deform the slot means portion of the tool arm and displace the central section thereof in a radial direction; the base support being mounted on a rotatably driving, tubular machine tool spindle, said central section including a cam surface inclined to the axis of rotation of the spindle, and an axially movable drawbar with a complemental cam surface extending through the spindle and being actuatable to move in a direction to cam the central section laterally in a direction toward the screw.

4. The assembly of claim 3 in which the drawbar and central section of the tool arm cam surfaces are positioned to wedge the central section in a direction down against the base support to axially load and lock the central section to the tool arm base support when the central section of the tool arm is moved radially outwardly to engage the screw.

5. The assembly of claim 3 in which an air pressure operated cylinder is connected to operate the drawbar and the cam surface comprises an axially inclined slot having parallel surfaces engaged by the complemental cam surface.

6. In a micrometrically adjustable remotely controlled tool arm assembly for mounting on the tubular rotary spindle of a machine tool:

(a) a tool arm base mounted to the free end of the spindle;
(b) a resilient tool arm with means thereon for generally centrally supporting a tool bar thereon, on a generally central section thereof;
(c) means for anchoring only the ends of the tool arm to the base;
(d) slot means extending through the tool arm between its ends and the generally central section to provide deformable portions permitting radial movement of the generally central section relative to the ends;
(e) the generally central section and base having axial openings provided therein;

(f) a drawbar extending axially up through the spindle base and generally central section;
(g) means for axially moving the drawbar;
(h) means cooperating between said drawbar and generally central section for drawing the generally central section down to lock it to the base when the drawbar is moved axially and simultaneously moving the generally central section radially relative to the ends; and
(i) a micrometrically adjustable member on one of said ends in position to be engaged by the generally central section to position it radially relative to the ends.

7. The assembly of claim 6 in which said means cooperating between the drawbar and generally central section comprises wedge surfaces.

8. In a micrometrically adjustable remotely controlled tool arm assembly for mounting on the tubular rotary spindle of a machine tool:
(a) a tool arm base mounted to the free end of the spindle;
(b) a reilient tool arm with means thereon for generally centrally supporting a tool bar thereon; on a generally central section thereof;
(c) means for anchoring only the ends of the tool arm to the base;
(d) slot means extending through the tool arm between its ends and the generally central section to provide deformable portions permitting radial movement of the generally central section relative to the ends;
(e) the generally central section and base having axial openings provided therein;
(f) a drawbar extending axially up through the spindle base and generally central section;
(g) means for axially moving the drawbar to and fro;
(h) cam means on the drawbar and generally central section for moving the generally central section radially in either direction relative to the ends of the tool arm dependent on the direction of movement of the drawbar; and
(i) a micrometrically adjustable member on each of said ends in position to be engaged by the generally central section to position it radially relative to the ends.

9. In a micrometrically adjustable remotely controlled tool arm assembly for mounting on the tubular rotary spindle of a machine tool or a non-rotating support;
(a) a tool arm base;
(b) a resilient tool arm with means on one portion thereof for supporting a tool bar thereon;
(c) means for anchoring another portion of the tool arm to the base;
(d) slot means extending through the tool arm between said portions to provide deformable portions permitting radial movement of the tool bar supporting portion relative to said another portion;
(e) the tool bar supporting portion and base having axial openings provided therein;
(f) an actuator extending axially through the base and tool bar supporting portion;
(g) means for moving the actuator; and
(h) means cooperating between said actuator and tool bar supporting portion for drawing the tool bar supporting portion axially down to lock it to the base when the actuator is moved and simultaneously moving the tool bar supporting portion radially.

10. The assembly of claim 9 wherein a micrometrically adjustable member on one of said portions is provided in position to be engaged by the other portion to position the portions relatively radially.

11. The assembly of claim 6 in which said means cooperating between the drawbar and generally central section comprises wedge surfaces.

12. In a micrometrically adjustable remotely controlled tool arm assembly for mounting on the tubular rotary spindle of a machine tool or a non-rotating support:
(a) a tool arm base;
(b) a resilient tool arm with means on one portion thereof for supporting a tool bar thereon;
(c) means for anchoring another portion of the tool arm to the base;
(d) slot means extending through the tool arm between said portions to provide deformable portions permitting radial movement of the tool bar supporting portion relative to said another portion;
(e) the tool bar supporting portion and base having openings provided therein;
(f) an actuator extending through the base;
(g) means for moving the actuator;
(h) cam means reacting between the actuator and tool bar supporting portion for moving the tool bar supporting portion radially; and
(i) a micrometrically adjustable member on said another portion in position to be engaged by the tool bar supporting portion to position it radially relative to the said another portion.

* * * * *